(12) United States Patent
Azadiabad et al.

(10) Patent No.: US 12,537,743 B2
(45) Date of Patent: *Jan. 27, 2026

(54) METHOD FOR RUNTIME ADJUSTMENT OF NETWORK SERVICES (NSs) TO MEET AVAILABILITY REQUIREMENTS

(71) Applicant: TELEFONAKTIEBOLAGET LM ERICSSON (PUBL), Stockholm (SE)

(72) Inventors: Siamak Azadiabad, Montreal (CA); Ferhat Khendek, Montreal (CA); Maria Toeroe, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

This patent is subject to a terminal disclaimer.

(21) Appl. No.: 18/571,420

(22) PCT Filed: Jun. 21, 2022

(86) PCT No.: PCT/IB2022/055755
§ 371 (c)(1),
(2) Date: Dec. 18, 2023

(87) PCT Pub. No.: WO2023/281337
PCT Pub. Date: Jan. 12, 2023

(65) Prior Publication Data
US 2024/0297824 A1 Sep. 5, 2024

Related U.S. Application Data

(60) Provisional application No. 63/218,721, filed on Jul. 6, 2021.

(51) Int. Cl.
*H04L 41/0895* (2022.01)
*H04L 41/5003* (2022.01)

(52) U.S. Cl.
CPC ...... *H04L 41/0895* (2022.05); *H04L 41/5003* (2013.01)

(58) Field of Classification Search
CPC . H04L 41/0895; H04L 41/5003; H04L 41/40; H04L 41/50
See application file for complete search history.

(56) References Cited

U.S. PATENT DOCUMENTS 8,037,475 B1 * 10/2011 Jackson ................. H04L 41/50
709/224
11,900,169 B1 * 2/2024 Dhandhania ............ G06F 9/485
(Continued)

FOREIGN PATENT DOCUMENTS

CN           103401944 A   * 11/2013
WO       2020095232 A1     5/2020

OTHER PUBLICATIONS

Khizar Abbas et al, Network Slice Lifecycle Management for 5G Mobile Networks: An Intent-Based Networking Approach, IEEE Access, vol. 9, May 28, 2021, pp. 80128-80146, USA.

*Primary Examiner* — Richard G Keehn
(74) *Attorney, Agent, or Firm* — Ericsson Inc.

(57) ABSTRACT

There is provided a method of runtime adaptation of a network service (NS), a corresponding network node and non-transitory computer readable media. The method comprises detecting a deviation from an availability constraint imposed on resources for the NS. The method comprises executing a runtime adjustment model to determine new values for adjustable configuration parameters of the NS. The method comprises reconfiguring the adjustable configuration parameters of the NS according to the new values.

25 Claims, 13 Drawing Sheets

(56) References Cited

U.S. PATENT DOCUMENTS

| | | | |
|---|---|---|---|
| 2009/0171703 A1* | 7/2009 | Bobak | G06Q 10/06 |
| | | | 705/7.15 |
| 2009/0172674 A1* | 7/2009 | Bobak | G06F 11/1482 |
| | | | 718/101 |
| 2009/0172769 A1* | 7/2009 | Bobak | H04L 41/5003 |
| | | | 726/1 |
| 2016/0366160 A1* | 12/2016 | Kapoor | H04L 41/0866 |
| 2017/0093750 A1 | 3/2017 | McBride | |
| 2020/0296005 A1 | 9/2020 | Nikain et al. | |

\* cited by examiner

METHOD FOR RUNTIME ADJUSTMENT OF NETWORK SERVICES (NSs) TO MEET AVAILABILITY REQUIREMENTS

PRIORITY STATEMENT UNDER 35 U.S.C. S.119(E) & 37 C.F.R. S.1.78

This non-provisional patent application claims priority based upon the prior U.S. provisional patent application entitled "METHOD FOR RUNTIME ADJUSTMENT OF NETWORK SERVICES (NSs) TO MEET AVAILABILITY REQUIREMENTS", application No. 63/218,721, filed Jul. 6, 2021, in the name of Azadiabad et al.

TECHNICAL FIELD

The present disclosure relates to the operation and maintenance of network services.

BACKGROUND

In previous work from the same authors, a design-time method was proposed which took as input a network service (NS) design, its related availability and disruption requirements and the characteristics of the available infrastructure resources, and generated the most suitable deployment options that met the requested availability and disruption requirements. This included mapping the requirements to low-level configuration parameters and adjustments of the NS design in terms of the number of instances for the different scaling levels to include any redundancy necessary to protect the NS functionalities.

Thus, the design-time method guaranteed that an instance deployed according to the NS design fulfilled the availability and disruption requirements as long as the infrastructure resources used for the NS instance were the same as the selected deployment options, i.e., the characteristics of the selected deployment options serve as constraints for the infrastructure.

After the NS instance is deployed, it cannot be guaranteed under all circumstances that the infrastructure resources used for the NS instance are the same as the deployment options selected by the previous method.

SUMMARY

The characteristics of the deployment may change over time due to failures, aging, load redistribution, or upgrades, for example. Hence there is a need for a method to perform the runtime adjustments of the configuration parameters so that an NS instance continues satisfying its availability and disruption requirements under the new/changed circumstances.

To support the runtime adjustments, machine learning and mathematical models are proposed which are constructed using a design-time method. That is, different changes in the infrastructure can be simulated by generating appropriate input for the design-time method, which then can determine the appropriate configuration parameters to fulfill the availability and disruption requirements of the NS under the simulated circumstances. The generated deployment options and the resulting configuration parameters serve as labels that can be used to train machine learning models to be used at runtime by a runtime adaptation module. This runtime adaptation module then can receive from one or more monitoring modules notifications of changes in the infrastructure based on which it can determine the new configuration values using the trained machine learning models and mathematical models of the impacted NS.

There is provided a method of runtime adaptation of a network service (NS). The method comprises detecting a deviation from an availability constraint imposed on resources for the NS. The method comprises executing a runtime adjustment model to determine new values for adjustable configuration parameters of the NS. The method comprises reconfiguring the adjustable configuration parameters of the NS according to the new values.

There is provided a network node for runtime adaptation of a network service (NS). The network node comprises processing circuitry and a memory. The memory contains instructions executable by the processing circuitry whereby the network node is operative to detect a deviation from an availability constraint imposed on resources for the NS. The network node is operative to execute a runtime adjustment model to determine new values for adjustable configuration parameters of the NS. The network node is operative to reconfigure the adjustable configuration parameters of the NS according to the new values.

There is provided a non-transitory computer readable media having stored thereon instructions for runtime adaptation of a network service (NS). The instructions comprise detecting a deviation from an availability constraint imposed on resources for the NS. The instructions comprise executing a runtime adjustment model to determine new values for adjustable configuration parameters of the NS. The instructions comprise reconfiguring the adjustable configuration parameters of the NS according to the new values.

The method, network node and non-transitory computer readable media provided herein present improvements to runtime adaptation of a network service (NS) and to the way operations support systems (OSS) and corresponding hardware operate.

DETAILED DESCRIPTION

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

A goal of the method disclosed herein is to ensure that the availability and service disruption requirements of a network service (NS) are satisfied at runtime.

To support the runtime adjustments, machine learning and mathematical models are proposed which are constructed using a design-time method. That is, different changes in the infrastructure can be generated for which the design-time method can determine the appropriate configuration parameters to fulfill the availability and disruption requirements of the NS. The generated deployment options and the resulting configuration parameters serve as labels that can be used to train machine learning models to be used at runtime by a runtime adaptation module. This runtime adaptation module then can receive, from one or more monitoring modules, notifications of changes in the infrastructure based on which it can determine the new configuration values using the trained machine learning models and mathematical models of the impacted NS.

Design-Time Method Overview

Figure 1:
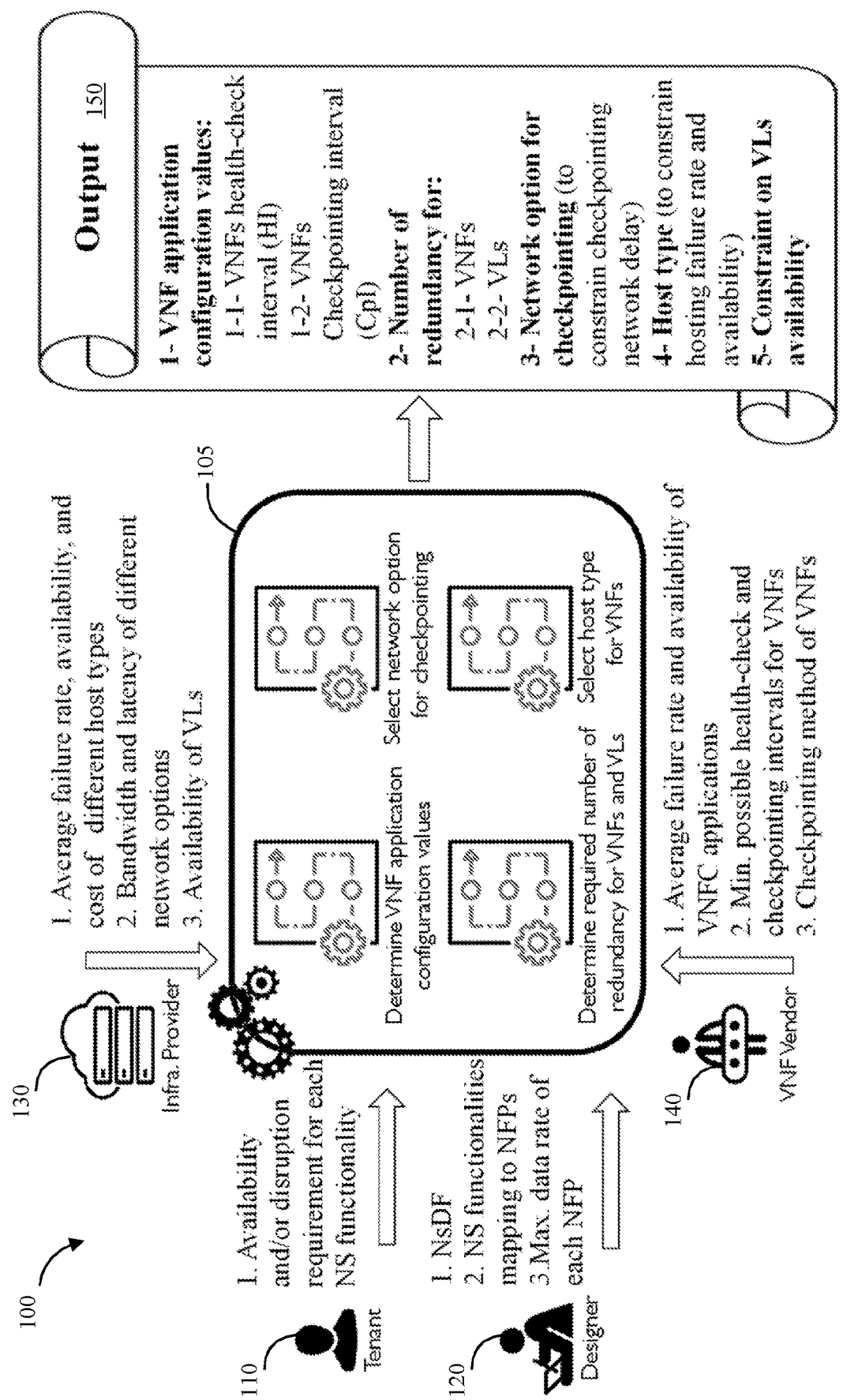
FIG. 1 is a block diagram illustrating a design-time method for mapping availability and service disruption requirements of an NS design to virtualized network function (VNF) applications configuration parameters and to numbers of redundant instances required for the VNFs and virtual links (VL) of a NS.

FIG. 1 provides an overview of a design-time method 100 which has for goal the mapping of the availability and service disruption requirements of an NS design to virtualized network function (VNF) applications configuration parameters and to numbers of redundant instances required for the VNFs and virtual links (VL) of the NS.

The box 105 in the middle of FIG. 1 indicates the main steps of the design-time method which takes inputs from the tenant 110, the NS designer 120, the infrastructure provider 130, and the VNF vendor 140. It generates the output 150 comprising VNF application configuration parameters, the required number of redundant instances for the VNFs and VLs of the NS, and the selected deployment options. These deployment options and some of the configuration parameters impose constraints on the virtualized infrastructure, while other configuration parameters can be adjusted if necessary.

The assumptions with respect to the input to the design-time method are the following.

For the NS design, an NS deployment flavour (NsDF) is given such that it satisfies the functional requirements of the tenant and the non-functional requirements with respect to the required workload capacity. However, the NsDF may not satisfy the tenant availability and disruption requirements, i.e., it may not include enough redundancy to protect the workload sufficiently, e.g., against failures if deployed on the infrastructure available from the infrastructure provider.

The correspondence between NS functionalities and network forwarding paths (NFP) is known. In other words, the NS functionality to NFP mapping is given, therefore the availability and/or disruption requirement for each NS functionality can be mapped to the corresponding NFP.

Accordingly, from the tenant's perspective, the availability and/or disruption requirements are expected as input for each NS functionality that can be provided by the NS design provided as input by the NS designer.

In addition, inputs are necessary on the VNFs composing the NS from the VNF provider. The parameters are the availability and failure rates of VNF applications, the upper boundaries for the health-check rate and checkpointing frequency, and the checkpoint size and method. It should be noted that, in FIG. 1, these are shown as minimum checkpointing and health check intervals. For the infrastructure, the following characteristics are needed as input.

The availability and failure rate of different hosting options since these availability characteristics of a host affect the availability of the guest VNFs.

The cost of each hosting option so that an optimal configuration in terms of the computing cost can be found.

The latency and maximum supported bandwidth for the available networking options, since the time necessary for checkpointing to a peer or an external DB depends on the network latency between the sender and receiver and the data to be transmitted.

The maximum availability for VLs supported by the networking infrastructure since it may be limited.

As output, the method provides:

the number of redundant instances for VNFs and VLs, the configuration values for VNFs health-check rate, the checkpointing interval for VNFs if it is configurable, the hosting option for each VNF, the networking option to be used for checkpointing for each VNF, and the requested availability of the VLs between VNFs.

The selected networking and hosting options put constraints on the network and on the hosts, as the parameters they were associated with for the calculations need to be maintained. Similarly, the requested VL availability is a constraint that the infrastructure needs to maintain. The reason why these characteristics of the selected options and configuration parameters are considered as constraints is because meeting the availability and/or disruption requirements, at minimal cost, can only be guaranteed as long as the infrastructure maintains these values as they were used in the calculations that determined the deployment configuration. In case any of these constraints is violated, the calculations are not valid anymore and a recalculation of other configuration parameters is necessary to determine any adjustment that would be needed to compensate for the violation at runtime.

The adjustable configuration parameters are the configurable checkpointing intervals, VNF health-check rates, and the number of redundant instances for VNFs and VLs.

Overview of the Runtime Adjustment Method

Figure 2:
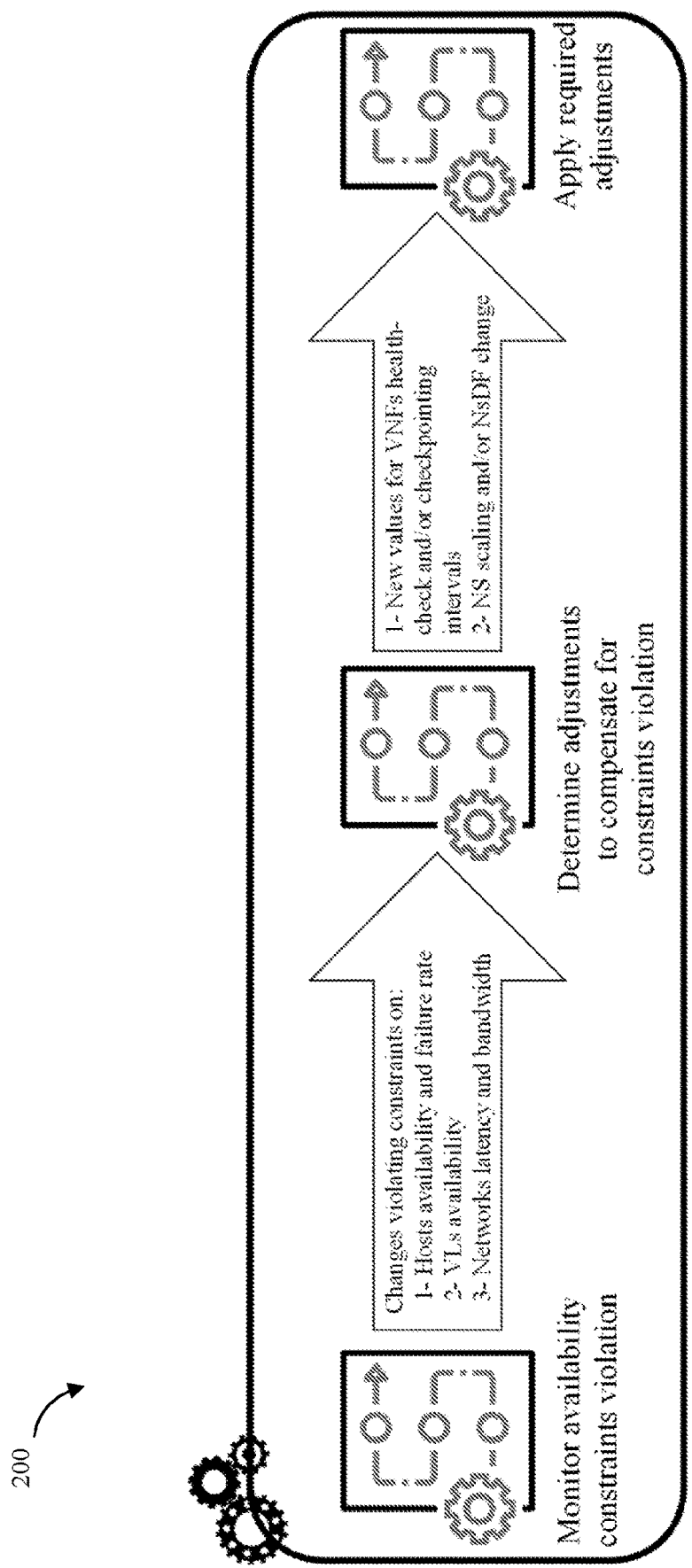
FIG. 2 is a block diagram illustrating a method for runtime adjustment of a network service.

FIG. 2 provides an overview of the proposed runtime adjustment method 200. A goal of the runtime adjustment method is to find new configuration values for the adjustable configuration parameters, to compensate for runtime changes in the infrastructure that result in deviations or violations of constraints that were imposed on the infrastructure resources.

Accordingly, the input to the runtime adaptation method are changes violating the constraints put on the infrastructure resources, that is, the failure rate and availability of hosts, the availability of VLs, and the latency and bandwidth of the network. Thus, these characteristics need to be monitored at runtime and changes need to be provided to the runtime adaptation module so that the values of the health-check rate and/or the checkpointing interval of VNFs, and/or request NS scaling, and/or change of the NsDF can be adjusted to continue to satisfy the availability and disruption requirements at minimal cost.

The proposed runtime adaptation method uses machine learning models built using configuration data generated for different deviations or violations of the different constraint using the design-time method, as well as mathematical models to determine at runtime the new configuration values for the NS. Thus, the prerequisite for the runtime adjustments is the construction of the runtime adjustment models.

Details of the NS Runtime Adjustment Model

Figure 3:
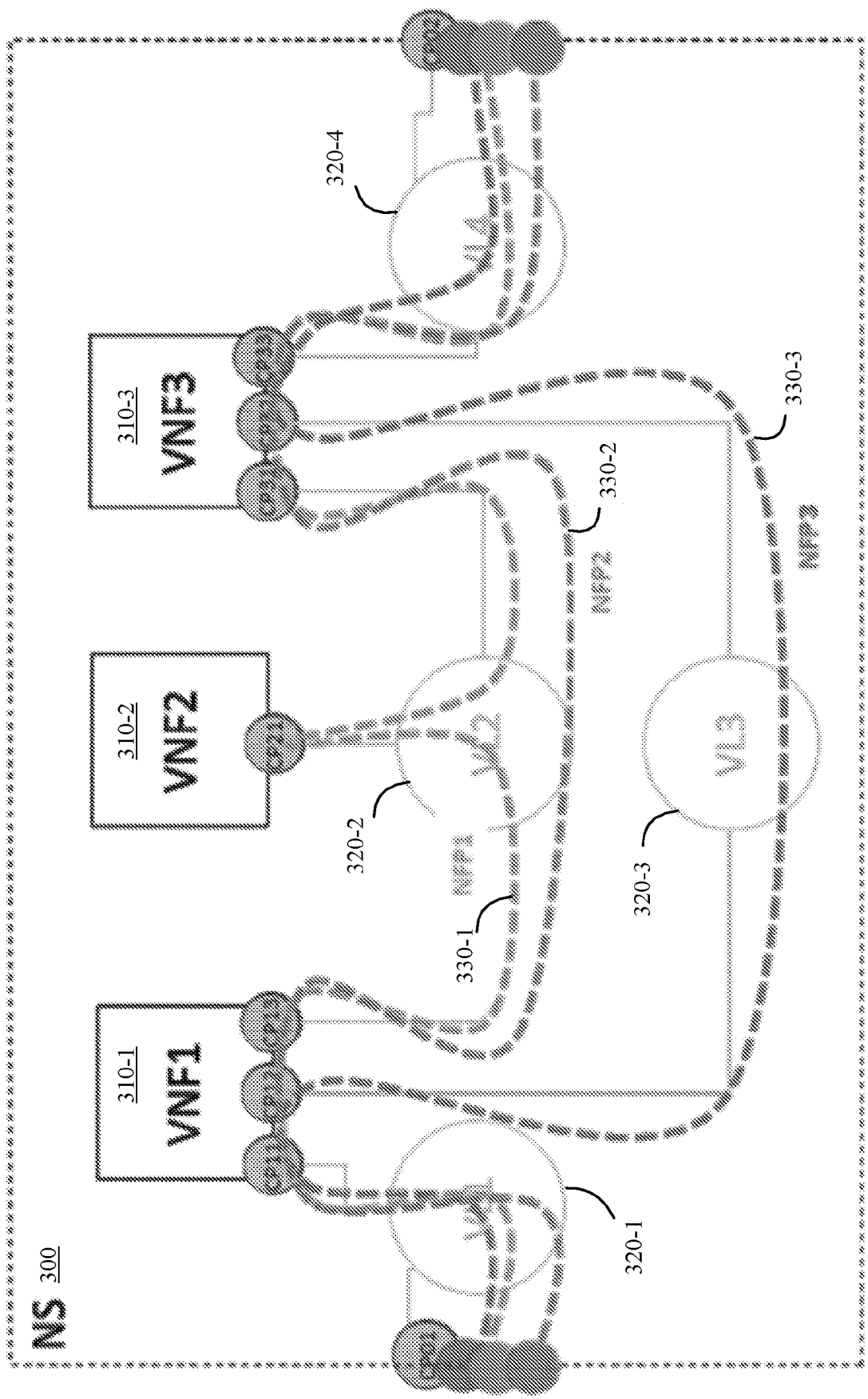
FIG. 3 is a block diagram of a sample NS.
Figure 4:
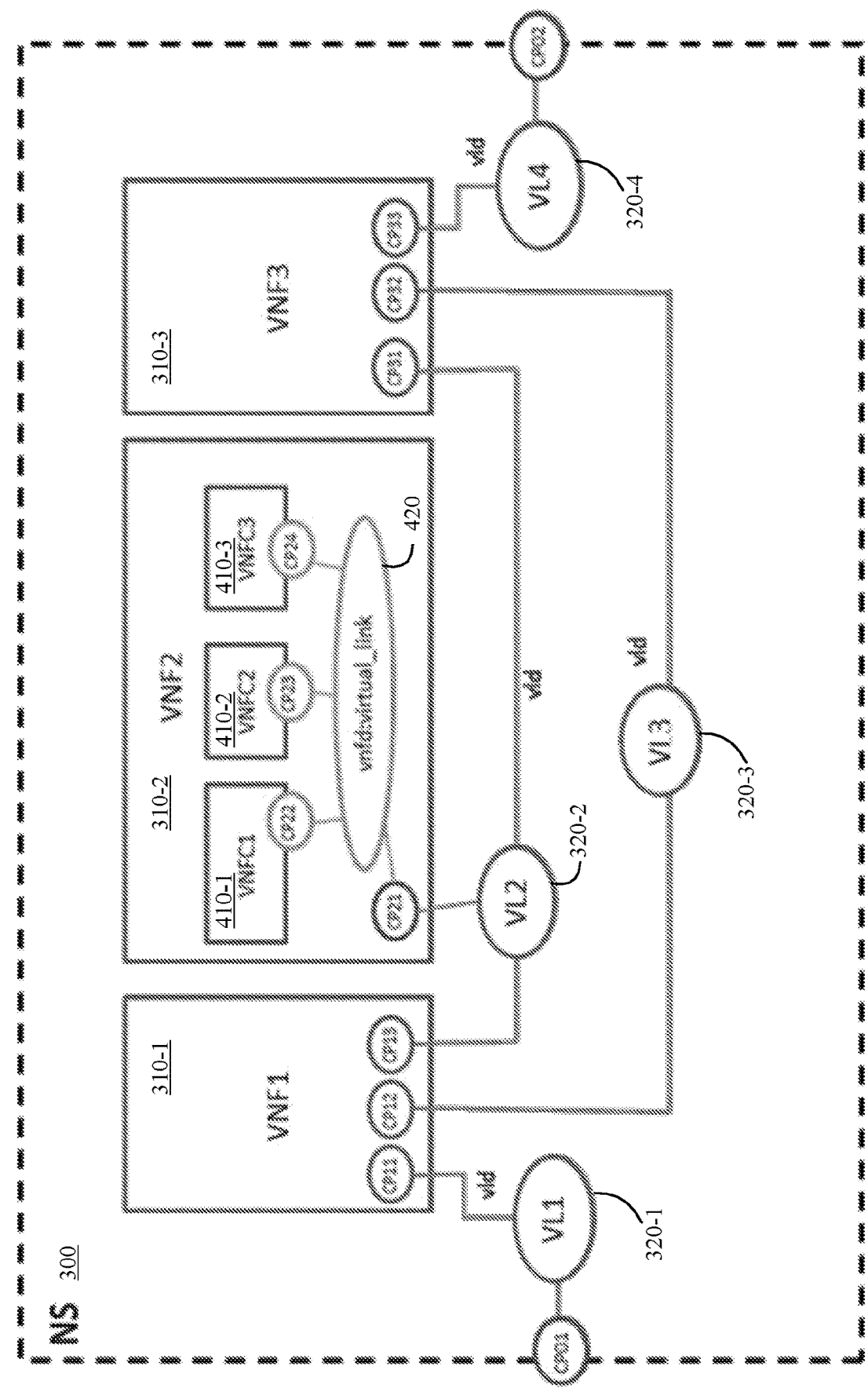
FIG. 4 is a block diagram of VNF components and internal VLs of a NS.

The details of the runtime adjustment method are explained in view of the example illustrated in FIGS. 3 and 4. The example is described first and is followed by the description of the model construction.

FIG. 3 illustrates an example NS 300, comprising three VNFs 310-1 to 310-3, generally 310, and four VLs 320-1 to 320-4, generally 320. The NS has three network forwarding paths (NFP) 330-1 to 330-3, generally 330, which can be mapped to three NS functionalities. VNF1 and VNF3 are shared by all NFPs, while VNF2 serves only NFP1. VL1 and VL4 are shared by all NFPs. VL2 is shared by NFP1 and NFP2, and VL3 is only used by NFP3.

FIG. 4 illustrates the VNF components (VNFC) 410-1 to 410-3, generally 410, and internal VLs 420 for the sample NS 300. VNF1 and VNF3 each consists of only one VNFC. However, VNF2 has three VNFCs and one internal VL.

The assumption is that this example NS was designed to satisfy certain functional and non-functional requirements as follows:

Functionality 1
   Maximum service data rate: 1 Mbps
   Acceptable Service Disruption Time=31.55 seconds per year
Functionality 2
   Maximum service data rate: 10 Mbps
   Required Availability=0.999999 per year
Functionality 3
   Maximum service data rate: 1 Mbps
   Required Availability=0.99999 per year
   Acceptable Service Data Disruption=1,048,576 bits per failure (i.e. 1 Mb per failure).

This information is available as input also for the creation of the machine learning models for the runtime adjustments together with details of the example NS 300, namely, the NFPs 330, VNFs 310, VLs 320, mapping of functionalities to NFPs, NS scaling levels and the maximum service data rate of each NFP. Some of this information is part of the preliminary NsDF, i.e., which has been designed to meet the functional requirements for the requested performance, the preliminary NsDF includes:

NFP names
   NFP1, NFP2, NFP3
VNF Profiles
   VNF1, VNF2, VNF3
VL Profiles
   VL1, VL2, VL3, VL4
NS Scaling Levels
   NS-SL1
     Number of instances for VNF1: 1
     Number of instances for VNF2: 4
     Number of instances for VNF3: 5
   NS-SL2
     Number of instances for VNF1: 2
     Number of instances for VNF2: 7
     Number of instances for VNF3: 8
   NS-SL3
     Number of instances for VNF1: 3
     Number of instances for VNF2: 10
     Number of instances for VNF3: 12
Maximum service data rate
   NFP1: 1,048,576 bps (i.e., 1 Mbps)
   NFP2: 10,485,760 bps (i.e., 10 Mbps)
   NFP3: 1,048,576 bps (i.e., 1 Mbps)
Functionality mapping
   NFP1: Functionality 1
   NFP2: Functionality 2
   NFP3: Functionality 3

Information about the VNFs is available in the form of the VNF deployment flavours and characterization of the VNF application and its internal reliability features.

As part of the VNF deployment flavours the VNFCs 410, internal VLs 420, and VNF scaling levels of each VNF are as follows:

VNF1
   VNFC Types: VNF1-VNFC1
   Internal VLs: none
   VNF Scaling Levels
     VNF1-SL1
       Number of instances for VNF1-VNFC1: 2
     VNF1-SL2
       Number of instances for VNF1-VNFC1: 3
VNF2
   VNFC Types: VNF2-VNFC1, VNF2-VNFC2, VNF2-VNFC3
   Internal VLs: VNF2-VL1
   VNF Scaling Levels
     VNF2-SL1
       Number of instances for VNF2-VNFC1: 1
       Number of instances for VNF2-VNFC2: 2
       Number of instances for VNF2-VNFC3: 1
     VNF2-SL2
       Number of instances for VNF2-VNFC1: 2
       Number of instances for VNF2-VNFC2: 3
       Number of instances for VNF2-VNFC3: 3
VNF3
   VNFC Types: VNF3-VNFC1
   Internal VLs: none
   VNF Scaling Levels
     VNF3-SL1
       Number of instances for VNF3-VNFC1: 2
     VNF3-SL2
       Number of instances for VNF3-VNFC1: 3

The additional information about the VNF applications is as follows.

For each VNF application, the minimum health-check interval, the health-check interval increment step, the failover time, the takeover time, the checkpoint size, the checkpoint preparation time, the checkpoint commitment time, and the checkpointing method are provided. These are provided for each VNF of the example NS in Table 1.

TABLE 1

Application-level information of the VNFs

| | VNF1 | VNF2 | VNF3 |
|---|---|---|---|
| Minimum health-check interval (ms) | 20 | 50 | 20 |
| Health-check interval increment step (ms) | 20 | 50 | 20 |

TABLE 1-continued

Application-level information of the VNFs

|  | VNF1 | VNF2 | VNF3 |
|---|---|---|---|
| Failover time (ms) | 10 | 10 | 10 |
| Takeover time (ms) | 5 | 10 | 5 |
| Checkpoint size (bit) | 10,240 | 10,240 | 20,480 |
| Checkpoint preparation time (ms) | 5 | 15 | 10 |
| Checkpoint commitment time (ms) | 5 | 10 | 5 |
| Checkpointing method is synchronous | Yes | No | No |
| Checkpointing interval is constant | Yes | No | Yes |
| Checkpointing interval is configurable | Yes | No | Yes |
| Minimum checkpointing interval (ms) | 20 | N/A | 20 |
| Checkpointing interval increment step (ms) | 20 | N/A | 10 |

Still referring to the example illustrated in FIGS. 3 and 4, for the VNFCs 410 of each VNF 310, the availability and average failure rate and the number of active/standby instances are:
VNF1
   VNF1-VNFC1 application
      Availability: 0.99999 per year
      Average failure rate per year: 1
VNF2
   VNF2-VNFC1 application
      Availability: 0.9999 per year
      Average failure rate per year: 1.5
   VNF2-VNFC2 application
      Availability: 0.9995 per year
      Average failure rate per year: 2
   VNF2-VNFC3 application
      Availability: 0.9995 per year
      Average failure rate per year: 2
   VNF Scaling Levels
      VNF2-SL1
         VNF2-VNFC1: 1
         VNF2-VNFC2: 1+1
         VNF2-VNFC3: 1
      VNF2-SL2
         VNF2-VNFC1: 2
         VNF2-VNFC2: 2+1
         VNF2-VNFC3: 2+1
VNF3
   VNF3-VNFC1 application
      Availability: 0.99999 per year
      Average failure rate per year: 1
   VNF Scaling Levels
      VNF3-SL1
         VNF3-VNFC1: 1+1
      VNF3-SL2
         VNF3-VNFC1: 2+1

Finally, the infrastructure available for the deployment is also characterized by the different hosting options as shown in Table 2, with the different network options as in Table 3. The maximum availability and failure rate of VLs that can be provided by the infrastructure are:
   maximum availability of 0.9995 per year, and
   average failure rate of 1 failure per year.

TABLE 2

Information about the different hosting options

|  | Host option 1 | Host option 2 | Host option 3 |
|---|---|---|---|
| Availability | 0.999 | 0.9995 | 0.9999 |
| Average failure rate | 2 | 1.5 | 1 |
| Cost coefficient | 0.85 | 0.9 | 1 |

TABLE 3

Information about the different network options

|  | Network option 1 | Network option 2 | Network option 3 |
|---|---|---|---|
| Latency (ms) | 3 | 10 | 50 |
| Max bandwidth (bps) | 20,971,520 | 15,728,640 | 15,728,640 |

Machine Learning Models for Runtime Adjustments of VNFs

Artificial neural networks (ANN) are a form of machine learning models that can simulate the processing of some information. To create an ANN usually four steps are necessary:
1. data collection,
2. data preprocessing,
3. model construction, and
4. model validation.

For an NS that is not yet deployed, no data can be collected in a real system. Instead, the design-time method can be used to generate the data set—called labels—necessary to train the ANN. In this case, random values are generated for the constrained characteristics of the infrastructure, that is, for the host failure rates, the VL failure rates, the network latency, and/or the network bandwidth. For each set of values, the corresponding adjustable configuration parameter values are determined using the design-time method so that the tenant's requirements are met. A set of input values and the generated output values compose a data structure referred to as labels.

The label structure shown in Table 4 is a good choice to predict at runtime the health-check interval (HI) and checkpointing interval (CpI) values for the VNFs of the example NS 300 that can meet the tenant's availability and disruption requirements. Table 4 also shows a sample label (i.e., one record of the training data set).

TABLE 4

Label structure to predict HI and CpI

| Features (Input) | | | | | | | |
|---|---|---|---|---|---|---|---|
| NS Level $(x_1)$ | VNF1 AFR $(x_2)$ | VNF2 AFR $(x_3)$ | VNF3 AFR $(x_4)$ | VNF1 NL $(x_5)$ | VNF2 NL $(x_6)$ | VNF3 NL $(x_7)$ | VNF1 BW $(x_8)$ |
| Nsl1 | 1.99 | 3.13 | 6.41 | 3 | 3 | 5 | 20,971,520 |

| Features (Input) | | Output | | | | | |
|---|---|---|---|---|---|---|---|
| VNF2 BW $(x_9)$ | VNF3 BW $(x_{10})$ | VNF1 HI $(y_1)$ | VNF2 HI $(y_2)$ | VNF3 HI $(y_3)$ | VNF1 CpI $(y_4)$ | VNF2 CpI $(y_5)$ | VNF3 CpI $(y_6)$ |
| 20,971,520 | 15,734,520 | 620 | 1,540 | 800 | 660 | 490 | 50 |

Input features of the label structure are the NS scaling level (NS Level), the average failure rate (AFR) of each VNF, the network latency (NL) of checkpointing for each VNF, and the network bandwidth (BW) of checkpointing for each VNF. The output parameters of the label structure are the HI and the CpI for each VNF.

This label structure can be generalized for an NS with n VNFs as shown in Table 5. Note that different label structures are possible, and the choice determines the precision of the predicted values. In this case, for example, one may consider the input and output parameters at the infrastructure, at the VNF or at the NS level. Since the availability and disruption requirements are imposed at the NS level by the tenant, it is better to have a label structure at the NS level as shown in table 5, which includes the VNFs as features, therefore the adjustments consider all impacting parameters simultaneously.

TABLE 5

Generalized label structure to predict HI and CpI

| Features (Input) | | | | | | | | Output | | | | |
|---|---|---|---|---|---|---|---|---|---|---|---|---|
| NS Level | $VNF_1$ AFR | ... | $VNF_n$ AFR | $VNF_1$ NL | ... | $VNF_n$ NL | $VNF_1$ BW | ... | $VNF_n$ BW | $VNF_1$ HI | ... | $VNF_n$ HI | $VNF_1$ CpI | ... | $VNF_n$ CpI |

Note also that the label structures of Table 4 and 5 do not address the VNFs redundancy. To include these predictions, outputs of the label structure need to include the number of standby instances of VNFs as shown in Table 6, i.e., adding the number of standby instances (SB) for each VNF to the output parameters. With no domain specific knowledge, one may opt for this simple label structure.

TABLE 6

Label structure to predict HI, CpI, and SB together

| Features (Input) | | | | | | | | | |
|---|---|---|---|---|---|---|---|---|---|
| NS Level ($x_1$) | VNF1 AFR ($x_2$) | VNF2 AFR ($x_3$) | VNF3 AFR ($x_4$) | VNF1 NL ($x_5$) | VNF2 NL ($x_6$) | VNF3 NL ($x_7$) | VNF1 BW ($x_8$) | VNF2 BW ($x_9$) | VNF3 BW ($x_{10}$) |
| Nsl1 | 1.85 | 12.5 | 3 | 3 | 50 | 50 | 22,649,2 | 15,728,6 | 15,728,6 |

| Output | | | | | | | | |
|---|---|---|---|---|---|---|---|---|
| VNF1 HI ($y_1$) | VNF2 HI ($y_2$) | VNF3 HI ($y_3$) | VNF1 CpI ($y_4$) | VNF2 CpI ($y_5$) | VNF3 CpI ($y_6$) | VNF1 SB ($y_7$) | VNF2 SB ($y_8$) | VNF3 SB ($y_9$) |
| 660 | 600 | 1,780 | 700 | 50 | 490 | 2 | 3 | 1 |

However, examining the domain specific knowledge embedded in the design-time method it could be seen that to determine the number of standby instances of a VNF, first, the health-check interval of the VNF is determined, then, the VNF outage time is calculated using the VNFs failure rate and the health-check interval. The number of standby instances is determined using the VNF outage time. Therefore, the number of standby instances of VNFs is determined based on the VNFs failure rate and health-check interval. This means that with the label structure of Table 6, both the health-check interval of a VNF and the number of standby instances are output parameters at the same time, therefore their dependency cannot be handled properly, i.e. typically the ANN model needs to be split each time there are dependent output parameters to remove the dependency. Thus, to follow the logic of the design-time method, it is better to construct a second ANN model.

That is, it is better to predict these output parameters in two steps. First, the HI and the CpI of VNFs using the label structure of Table 4. Then, using these results the number of standby instances can be predicted using a label structure shown in Table 7 where the input features are the AFRs of the VNFs together with the HI values predicted by the first ANN model.

TABLE 7

Label structure to predict SB after predicting the HI

| | Features (Input) | | | | | | Output | | |
|---|---|---|---|---|---|---|---|---|---|
| NS Level ($x_1$) | VNF1 AFR ($x_2$) | VNF2 AFR ($x_3$) | VNF3 AFR ($x_4$) | VNF1 HI ($x_5$) | VNF2 HI ($x_6$) | VNF3 HI ($x_7$) | VNF1 SB ($y_1$) | VNF2 SB ($y_2$) | VNF3 SB ($y_3$) |
| Nsl1 | 1.85 | 12.5 | 3 | 660 | 600 | 1,780 | 2 | 3 | 1 |

As a result, for the runtime adjustments, two ANN models are chained through the results of the first model which are used by the second model as input.

Using these label structures and model chaining, sufficient input data needs to be generated by generating random values for the respective features of the label structure of each ANN model. For example, a runtime change is simulated by first randomly selecting one or more input features (e.g., AFR parameters of one or more VNFs) to change, and then generating random values for these selected parameters. Next, the design-time method is used to generate the output values corresponding to these changed inputs to create a new label with all the necessary data.

The Data Preprocessing step is performed according to the general methodology which includes encoding categorical data, data scaling and normalization. The data is also cleaned by removing all label duplicates to ensure that there is no overlap between the training and the validation sets. Finally, 10% of the generated labels are set aside for the model validation and 90% of the data compose the training set.

The Model Construction also follows the standard methodology of determining the number of hidden layers and the number of nodes for the hidden and the output layers. In the example, the first two numbers are the same for all NSs: the number of hidden layers is 19, and the number of nodes for each hidden layer is 35. However, the number of nodes for the output layer depends on the number of VNFs in the NS and it is twice the number of VNFs in the NS for the first ANN, while it is the number of VNFs in the NS for the second.

In the example, the activation function for hidden layers is the Rectified Linear Unit (ReLU) function for both ANNs, and the output layer uses a linear function since the problem is a regression. The loss function is the mean squared error while the optimizer is the ADAM (adaptive moment estimation) algorithm.

Finally, the training portion of the first set of labels predicting the HI and CpI parameters is applied to a first ANN instance of the specified parameters to learn the appropriate output for the input values in the set. Then the resulting ANN model is validated using the labels set aside for validation. If successful, the same process is applied to a second ANN instance using the training portion of the labels generated to predict the required number of standby instances. The resulting ANN model instance is validated using the labels set aside for this purpose. Note that there is no need to chain the two ANN models for the validation as the training data of the second ANN also covers a wide range of solutions.

A prototype was implemented in Python language using the TensorFlow library to verify the approach. After executing the model training for the prototype for 20,000 epochs with 76,000 labels, the resulting model was checked using the set of validation labels. Table 8 shows the standard deviation between each parameter predicted by the ANN models and its optimal value determined by the design-time method.

TABLE 8

Validation result using chained ANN models for predicting the new configuration values

| Parameter | Average | Standard Deviation |
|---|---|---|
| VNF1_HI | 1071.332 | 63.486 |
| VNF1_CPI | 882.395 | 26.925 |
| VNF2_HI | 698.098 | 35.447 |
| VNF2_CPI | 50.000 | 0.000 |
| VNF3_HI | 2564.516 | 119.640 |
| VNF3_CPI | 487.007 | 10.394 |
| VNF1_SB | 2.072 | 0.111 |
| VNF2_SB | 3.040 | 0.170 |
| VNF3_SB | 1.000 | 0.000 |

Note that the ANN models need to be created for each NS instance individually as they are built considering not only the NS design, but also the available deployment infrastructure and the tenant's availability requirements, all of which may vary from deployment to deployment. Accordingly, these models become part of the artifacts accompanying the NS design to be deployed on the given architecture for given availability requirements.

Model for Runtime Adjustment of VL Redundancy

Figure 5:
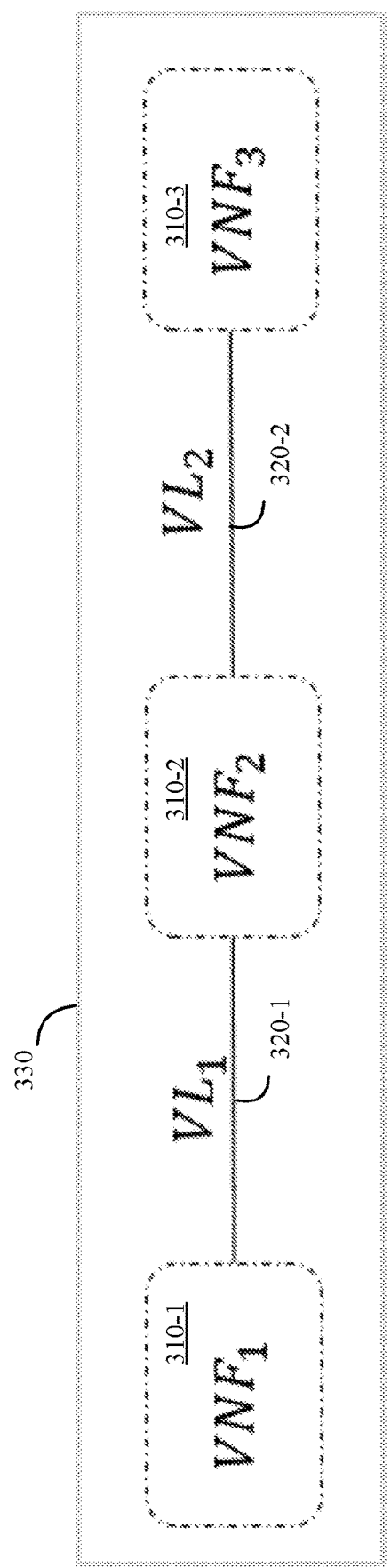
FIG. 5 is a block diagram of network forwarding paths (NFP) with three VNF and two VL profiles.

At design-time the number of VL instances that meets the required availability is calculated as follows. An NFP is available if all its VNFs and VLs are available. A VNF or a VL is available if at least one of its active instances is available. For example, considering the NFP 330 of FIG. 5 with three VNFs 310, two VLs 320, the NFP is available if VNF1, VNF2, VNF3, VL1 and VL2 are all available.

With respect to the required availability for NFP, as shown in inequation (1), the product of the availability of the VNFs and the VLs should not be less than the required availability.

$$(VNFs \text{ availability}) * (VLs \text{ availability}) \geq RA \quad (1)$$

Thus, the availability of each VL should satisfy inequation (2).

$$VL \text{ availability} \geq \sqrt{RA} \quad (2)$$

Therefore, for this example, the expected availability of each VL should not be less than the fourth root of RA, as shown in inequation (3).

$$\text{Expected Availability of Each } VL \geq \sqrt[4]{RA} \quad (3)$$

Equation (3) can be generalized as equation (4) to be used for any NS.

$$\text{Expected Availability of Each } VL \geq \sqrt[2*(number\ of\ VLs)]{RA} \quad (4)$$

Once the Expected Availability of each VL (VlEA) has been calculated, it can be compared with the maximum availability of VL instances ($A_{vl\text{-}max}$) that the given infrastructure can provide. If the $A_{vl\text{-}max}$ is not less than the VlEA, one VL instance is enough for each VL. Otherwise, the VLs require redundancy. For each VL, the minimum number of instances (n) needs to be determined that keeps the availability of the redundant VLs ($A_{VL}$) greater than or equal to the VlEA, as shown in inequation (5).

$$A_{VL} \geq VlEA \quad (5)$$

The availability of the n redundant VLs is calculated using equation (6).

$$A_{VL} = 1 - (1 - A_{vl\text{-}max})^n \quad (6)$$

Therefore, inequation (7) can be used to determine the number of instances.

$$n \geq \log_{(1-A_{vl\text{-}max})}(1 - VlEA) \quad (7)$$

Thus, inequation (7) can be used for the runtime adjustment of VL redundancy.

If the availability of a VL instance changes at runtime and its current availability ($A_{vl\text{-}current}$) differs from the availability calculated at design-time, inequation (8) gives the new value for the number of required instances.

$$n \geq \log_{(1-A_{vl\text{-}current})}(1 - VlEA) \quad (8)$$

This means that for the runtime adjustment of VL redundancy there is no need for machine learning since the mathematical model is simple and independent from the size of the NS. It is nevertheless tied to a specific deployment of the NS design and also needs to be part of the artifacts accompanying the NS design.

Steps of the NS Runtime Adjustment Model Creation

As mentioned, a specific runtime adjustment model is necessary for each NS instance as the model depends on the NS design, the given infrastructure and the availability and disruption requirements. For each NS the runtime adjustment model includes three models: two ANN models for the adjustment of the configuration of the VNFs and a mathematical model for the redundancy adjustment of VLs.

Figure 6:
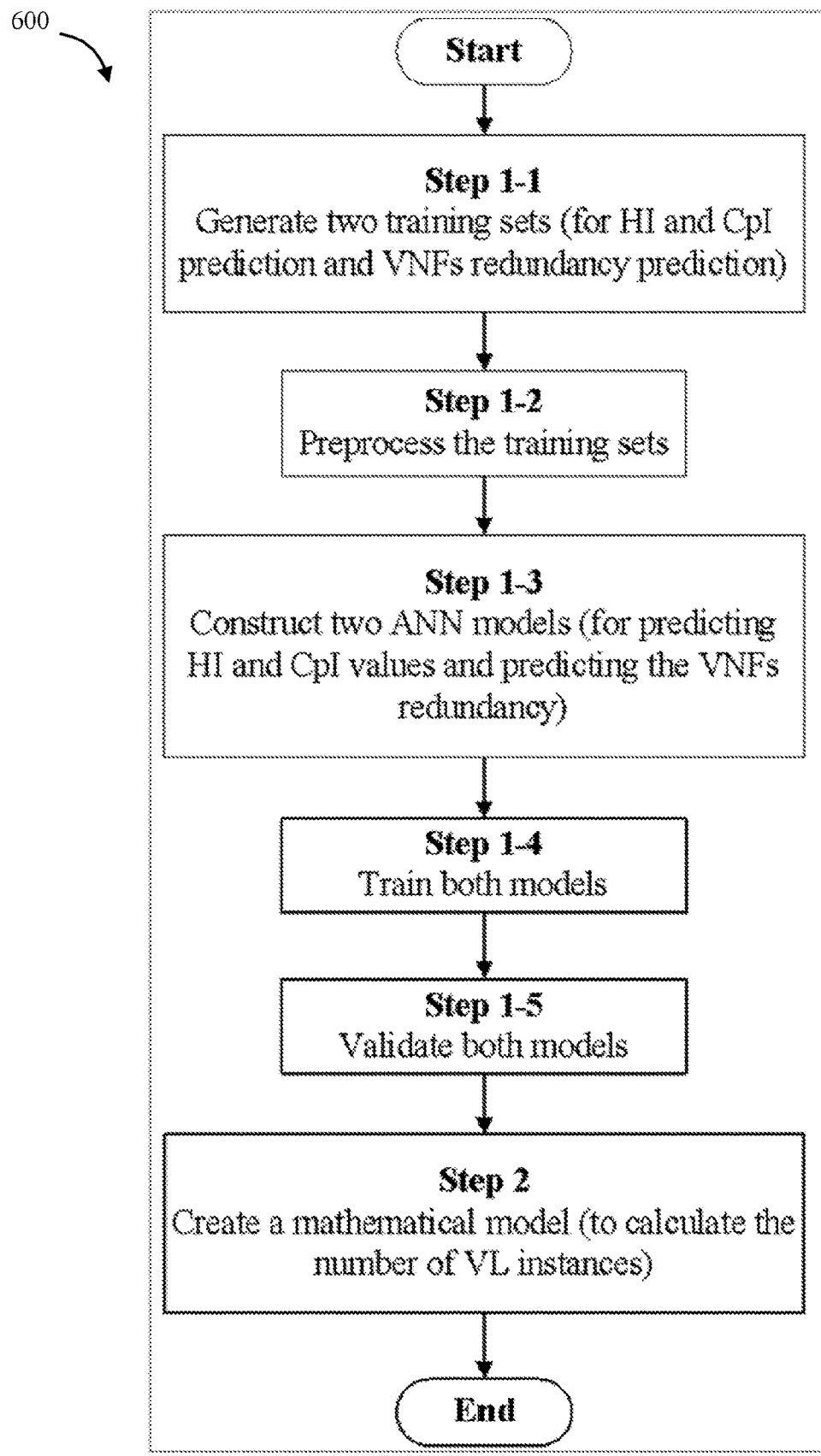
FIG. 6 is a flowchart of a method for NS runtime adjustment model creation.

Turning to FIG. 6, a flowchart 600 of the high-level steps of constructing a runtime adjustment model, for a given NS design to be deployed on a given infrastructure to satisfy the given tenant's requirements, is provided:

1. Create two ANN models for VNFs configuration adjustment
   1-1 Generate two training sets:
      One for HI and CpI prediction,
      Another for VNFs redundancy prediction.
   1-2 Preprocess both training sets.
   1-3 Construct the two ANN models:
      One for predicting HI and CpI values,
      Another for predicting the VNFs redundancy.
   1-4 Train both models.
   1-5 Validate both models.
2. Create a mathematical model to calculate the number of VL instances.

Runtime Adjustment Method

Figure 7:
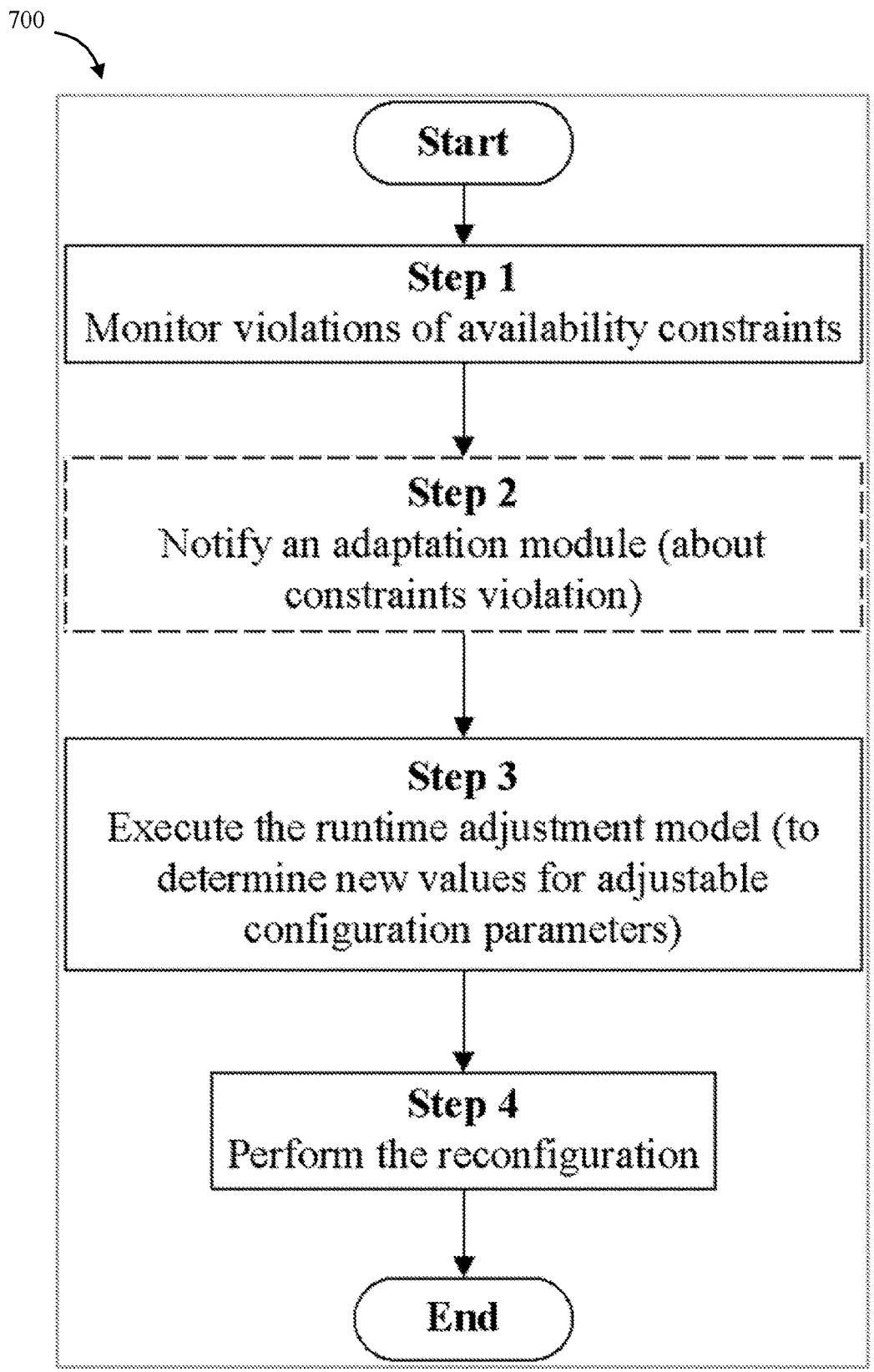
FIG. 7 is a flowchart of a method for runtime adjustment.

FIG. 7 illustrates the main steps of the proposed runtime adaptation procedure 700, which includes:
1. Monitor (potential) violations of, or deviations from, availability constraints,
2. Notify an adaptation module about constraints violation,
3. Execute the runtime adjustment model to determine new values for adjustable configuration parameters, and
4. Perform the reconfiguration as needed.

The monitoring step is performed continuously across the system to detect real or potential violations of the availability constraints. Whether real or potential violations are detected depends on the capabilities of the monitoring modules.

The design-time method maps the availability and service disruption requirements to availability constraints on characteristics of different resources. The design-time method provides an initial state and the following resource characteristics are monitored at runtime:
  availability of VLs,
  network latency,
  network bandwidth,
  availability of physical hosts, hypervisors, and virtual machines,
  failure rate of physical hosts, hypervisors, and virtual machines,
  number of VNF instances,
  number of VL instances,
  availability of VNF applications, and
  failure rate of VNF applications.

An NS will meet its availability and service disruption requirements at runtime at a minimal cost as long as these availability constraints are met. However, resource characteristics can change at runtime, for example, due to host failures or lack of them, hypervisor upgrades and so on. These changes may result in violating one or more of the availability constraints and thus impact the availability and service disruption of the NS. Hence these characteristics or events that may impact these characteristics are monitored.

Any detected deviations or events potentially causing violation are reported. In the simplest case, rather than reporting the changes to the availability and/or failure rate, the actual state changes of the resources are reported to the runtime adaptation module which is capable of evaluating the characteristics with respect to the related availability constraints. In a more advanced scenario, the task of the runtime adaptation module may be distributed to the different Management and Orchestration (MANO) functional blocks of the NFV system, each of which can then evaluate changes in their managed entities with respect to the availability constraints. Note that the MANO functional blocks can perform such evaluations as part of auto-scaling or auto-healing scripts triggered by performance indicators or failure notifications.

The goal of reporting the changes at runtime is to adapt the NS and its constituents to compensate for the changes so that the availability and disruption requirements are met at minimal cost. The adaptation is achieved by adjusting some configuration parameters. In the simplest case the adjustments are determined at the NS level only, while in the more advanced case adjustments can be performed at each level of the MANO functional blocks and only deviations that cannot be compensated for at a given level are reported to the next level.

The configuration parameters adjustable at runtime for an NS are the following:

Health-check interval (HI),
Checkpointing interval (CpI),
Number of standby instances for VNFs, and
Number of standby instances for VLs.

The assumption is that at the VNF application-level health-checks are performed and the HIs of these health-checks are configurable. Also, at the VNF application level, checkpointing is performed, but the CpI may or may not be configurable. In addition, the role of the VNF instances, i.e., whether it is active or standby, can be set at the VNF application level and accordingly the external VL instances can also be active or standby. The MANO functional blocks are not aware of these application-level parameters.

In case the runtime adaptation module is distributed to the MANO functional blocks, additional characteristics can be monitored. For example, at the infrastructure level, the Virtual Infrastructure Manager (VIM) may migrate virtual machines to other more suitable physical resources and/or use watchdogs, heartbeats or health-checks to monitor directly or indirectly the physical resources, the hypervisors and/or virtual machines. Similarly, at the VNF level, health-checks may be used to detect the failure of the VNFC application instances to trigger VNF healing operations with the VNF Manager (VNFM). The interval of these health-checks may also be configurable at runtime similarly to the NS level attributes, and also similarly these health-check intervals are not visible to a generic VNFM, but it could be visible to a VNF-specific VNFM.

The number of VNF and VL instances for each scaling level of a NS deployment flavor (NsDF) is determined at design-time and provided in the NS descriptor (NSD)—the artifact describing the NS design. At runtime, the number of VNF and VL instances of a running NS instance can change by NS scaling according to these predefined numbers of NsDF, or by switching the NS instance to another more appropriate NsDF. In either case, the MANO only changes the number of instances based on the NSD, it is not aware of the active/standby role of the instances. The NS scaling may be triggered by the OSS or by the NFV Orchestrator (NFVO) of MANO, provided the NSD indicates some monitored parameters associated with some rules or policies. To provide the number of instances in the NsDFs for each scaling level, the required number of active and standby instances are determined at the NS design-time. This information could be part of the NS design, in which case it is provided (e.g. as an additional artifact) to and used by an application-level manager or the OSS. That is, the active/standby roles may be handled internally or externally.

It should be noted that since an NS scaling level represents the number of VNF and VL instances required for handling a service traffic volume with the requested availability characteristics, it is possible to replace the NS scaling level directly with the maximum service traffic volume guaranteed with the requested characteristics (performance and availability). In the label structures of tables 5 to 7, the NS level input feature can be replaced by the maximum service traffic volume, and the active (or the total i.e., active+standby) number of VNF instances can be added to the output part of these label structures. When such labels structures are used to generate training data for machine learning, the resulting ANN models link the maximum service traffic volume with the required number of VNF instances. This means that the maximum service traffic volume becomes a constraint to be observed instead of the observing the NS scaling level. Therefore, the service traffic volume changes can be monitored directly, instead of monitoring the NS scaling level changes, to determine if adjustments are needed in the number of VNF instances when deviations are detected. This way, the model becomes capable of handling the NS scaling in an enhanced way. The enhancement lays in the combination of the scaling required for handling the service traffic volume (number of active VNF instances) and the scaling required to protect this traffic volume (number of standby VNF instances). This eliminates the need for providing the NS scaling levels in the NsDF in the way it is done today, which is very static and too rigid for a dynamic system. This also requires that the NFVO accepts scaling requests by specifying the number of VNF instances.

The situation is similar with respect to each VNF instance. That is, the VNF descriptor (VNFD) may provide the scaling levels for the instances of the VNF, or a VNF may be scaled by scaling each of its VNFCs independently. The VNFC instances within a VNF instance may have active and standby roles, which may be visible for a VNF-specific VNFM but not to a generic VNFM.

The runtime adaptation module executes the runtime adjustment model whenever a deviation or a potential constraint violation is detected. In case of a potential violation report, the module first calculates from the reported changes and potential historical data whether there is constraint violation. For example, if failures are reported instead of failure rates and availability for some resource, the runtime adaptation module needs to calculate first how the reported failure changes the failure rate and availability characteristics of the resource and, if these new values violate the related constraints, the runtime adjustment model is executed to determine the new configuration parameters.

For NS level adaptation, the discussed NS runtime adjustment model is used as described earlier, first providing the input values according to the current characteristics of the NS for the first ANN model to determine the HI and CpI values. Then these values are used together with the related current characteristics as input for the second ANN to determine the number of standby instances. Finally, the mathematical model is used to determine the VL redundancy. With that, the runtime adaptation module can determine the changes needed in the configuration and request any NS deployment flavour change or NS scaling from the NFVO if necessary. The runtime adaptation module may also request the configuration of the active/standby roles of the VNF and VL instances, and it can also set the appropriate values of HI and CpI. The latter changes may be requested towards the element managers handling the appropriate VNFs, or, if the VNFs expose any of these parameters as configurable attributes defined in the VNFD, then the runtime adaptation module can set the changes via the MANO. Considering these tasks, one possible placement for the runtime adaptation module is in the OSS.

If the runtime adaptation module is distributed, the VIM and/or the VNFM may use ANN and/or mathematical models in a way similar to the NS runtime adjustment model. The source of these models could be the VNF vendors and the infrastructure resource vendors. For example, the vendor providing the virtualization solution may provide an ANN model to estimate the availability of VMs based on the physical host, the flavour of the VMs, the number of collocated VMs and the heartbeat interval. For a VNF, the VNF vendor may provide a VNF runtime adjustment model similar to the NS runtime adjustment model, where, instead of VNFs, the VNFCs characteristics are considered.

Now that the adaptation module placement in the NFV architecture is determined, it is possible to elaborate on the steps of the runtime adaptation procedure. The first step is monitoring. In the current specifications, the VIM is responsible to manage resources and is not responsible to monitor the violation of availability constraints. However, the VIM can monitor changes of resources, like host switch, network option change, or updates and upgrades. So, it is assumed that the adaptation module knows the availability of different resources and the impact of updates and upgrades on the availability of resources. So, if the adaptation module is notified about changes of resources, it can determine whether an availability constraint is violated or not.

Figure 8:
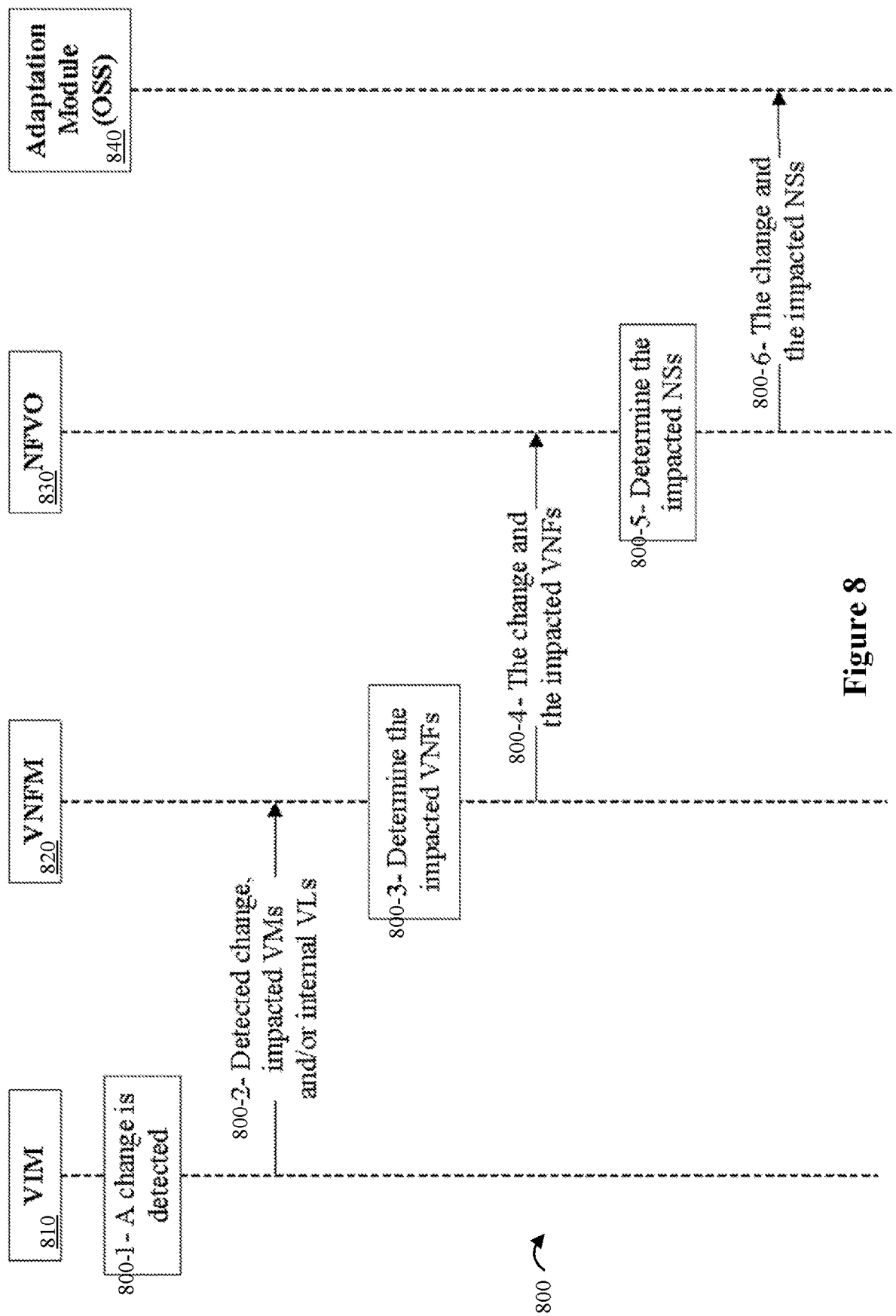
FIG. 8 is a sequence diagram illustrating a notification flow for changes that impact VNFs.

FIG. 8 illustrates the flow 800 of messages for the case when the NS runtime adaptation module 840 residing in the OSS needs to be notified. A change is detected by the VIM 810 (e.g., a failure of a host), step 800-1, which reports this change to the VNFM 820 by sending a notification reporting also the VMs and/or internal VLs (i.e., virtual links interconnecting VNFCs within VNF instances) impacted by the failure, step 800-2. The VNFM 820 identifies, based on the impacted VMs and/or internal VLs, the VNFs impacted by the failure, step 800-3, and reports these together with the cause to the NFVO by sending a notification, step 800-4, to the NFVO 830. The NFVO determines the NSs impacted by the failure, step 800-5, and reports these and the change to the NS runtime adaptation module(s), step 800-6, which then determines for each impacted NS if adjustments are necessary.

Figure 9:
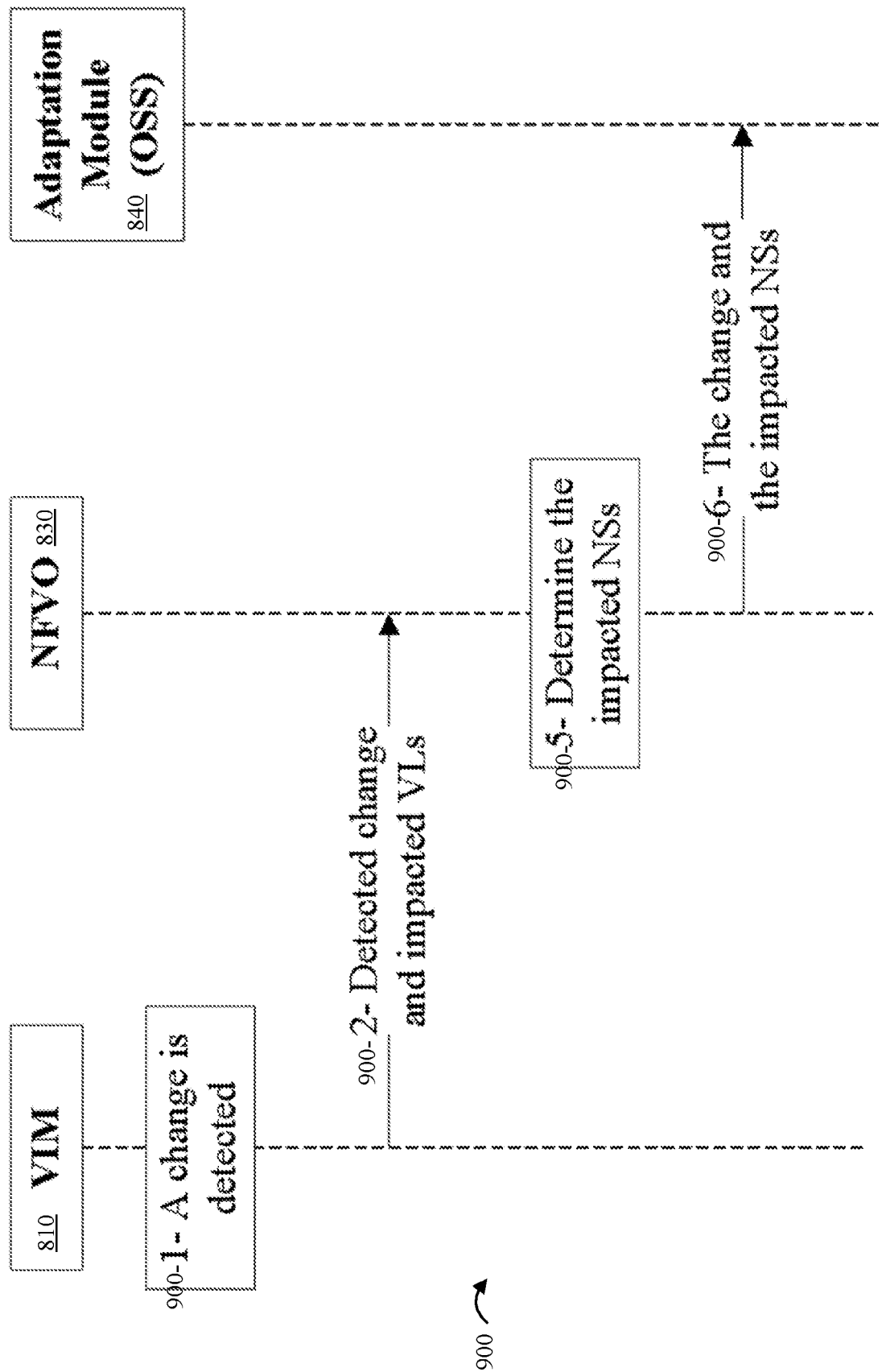
FIG. 9 is a sequence diagram illustrating a notification flow for changes that impact VLs at NS level.

FIG. 9 shows the notification flow 900 for changes that impact VLs at the NS level. In this case the VIM 810 detects a change, step 900-1, and reports the change and the impacted VLs directly to the NFVO 830, step 900-2, which in turn determines the NSs impacted, step 900-5, and notifies the responsible NS runtime adaptation module(s), step 900-6.

Figure 10:
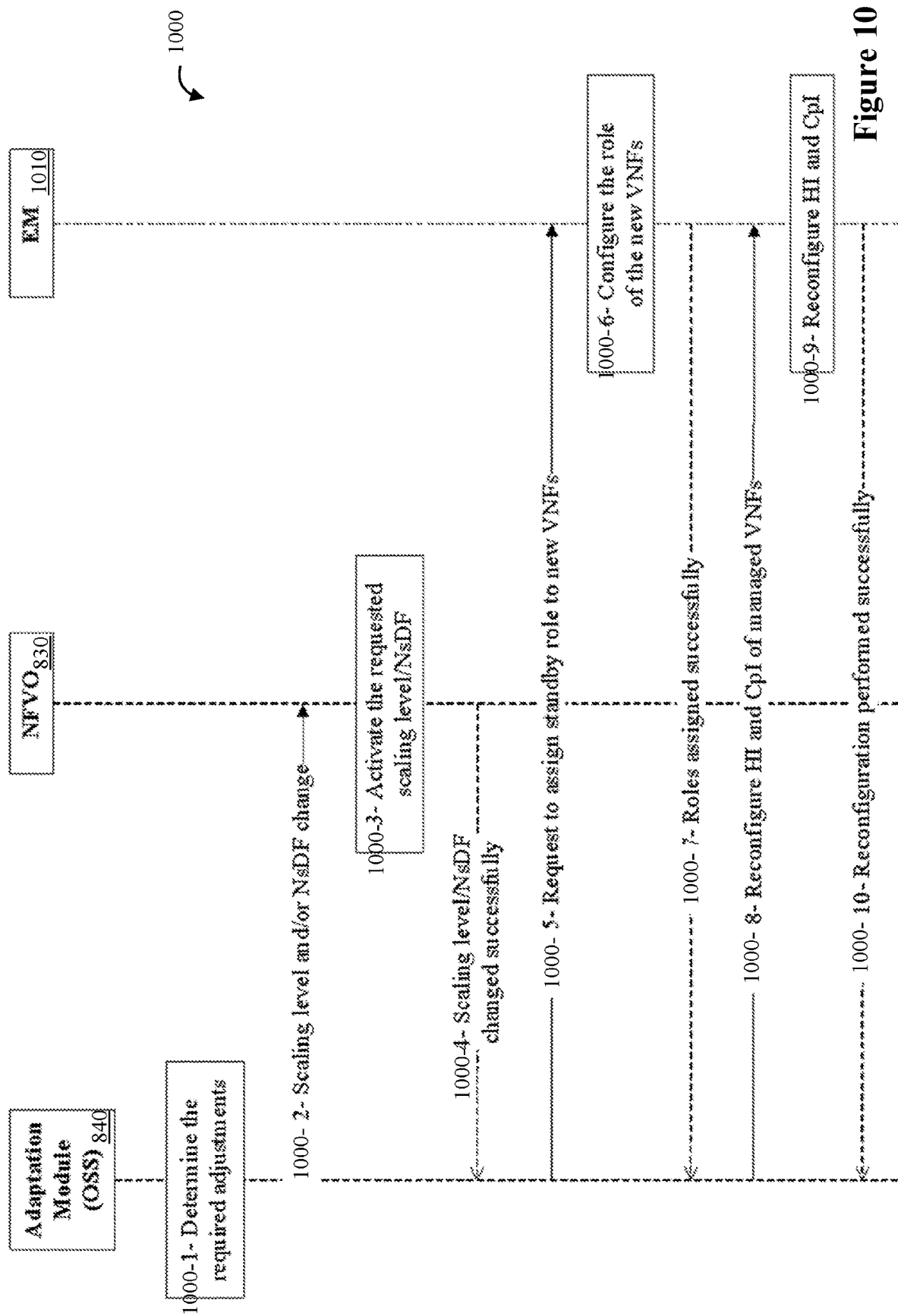
FIG. 10 is a sequence diagram illustrating steps for configuration parameters adjustment.

Turning to FIG. 10, once an NS runtime adaptation module 840 is notified about a change or it has determined that there is a change, it determines any required adjustments, step 1000-1, as described earlier using the NS runtime adjustment model. If changing an NsDF is needed, then, the adaptation module sends a request, step 1000-2, to the NFVO. The NFVO 830 applies the requested scaling level and/or deployment flavor, step 1000-3, and reports the successful change to the OSS, step 1000-4. Based on the new scaling level and/or NsDF, new VNF instances are instantiated, and they should have a standby role. Accordingly, the NS runtime adaptation module 840 sends a request to the element manager (EM) 1010, step 1000-5, of each VNF to assign a standby role to the newly instantiated VNFs, step 1000-6. Once the role is assigned to the VNFs, step 1000-7, the adaptation module requests the EMs to reconfigure HI and CpI of their own managed VNFs, step 1000-8. The EM 1010 reconfigures the HI and CpI and reports successful reconfiguration at steps 1000-9 and 1000-10.

Figure 11:
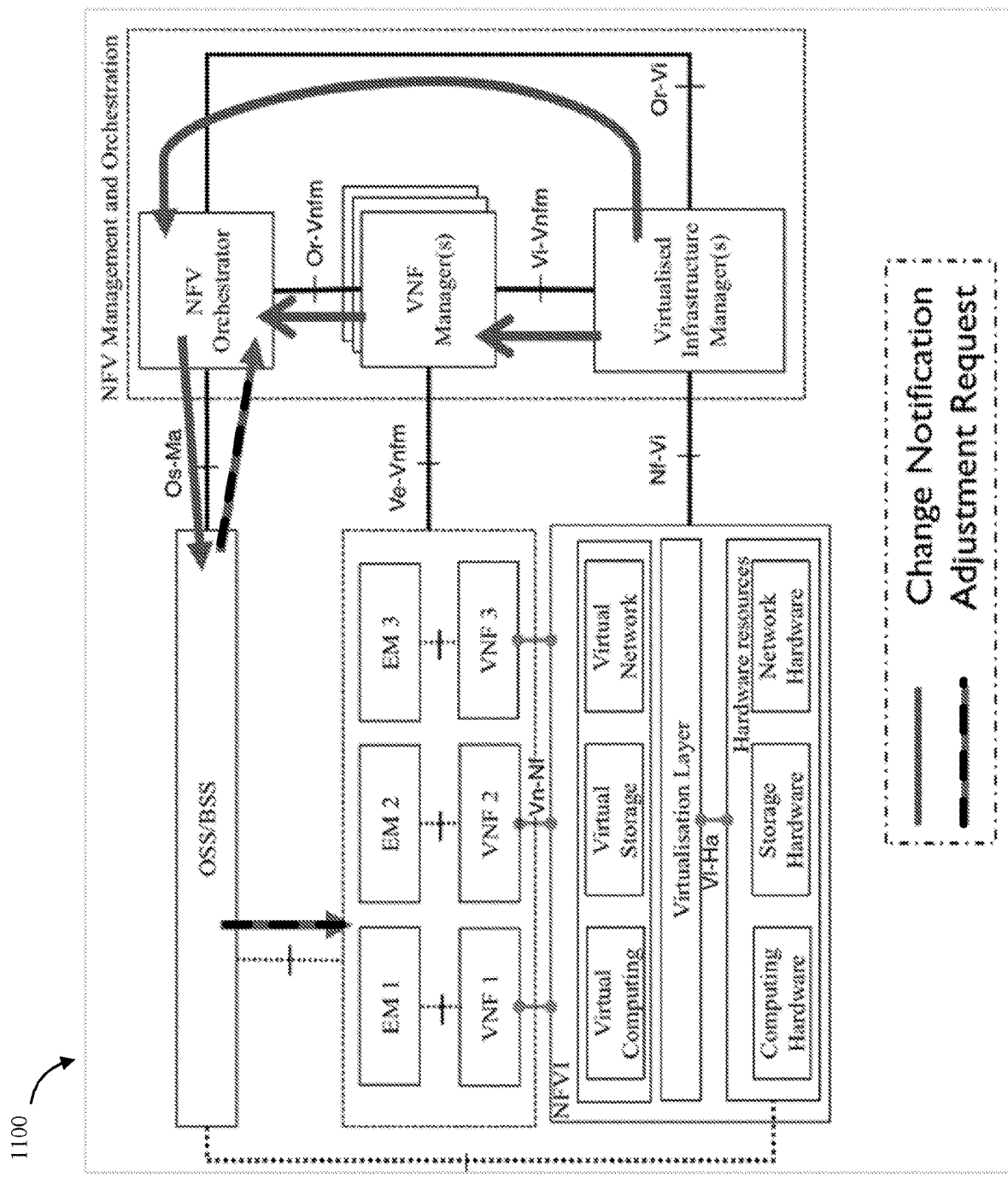
FIG. 11 is a block diagram illustrating a notification and adjustment flow in the VNF reference architecture.

FIG. 11 shows the notification and adjustment flows of FIG. 10 in the NFV reference architecture. Plain arrows show the change notification flow and dotted arrows show the communications for the adjustment of configuration parameters.

As previously explained in great details, an NS needs to satisfy its availability and disruption requirements at minimal cost throughout its life cycle, however the conditions under which it operates may change over time. These changes may impact the availability of the NS and cause disruptions that would not be acceptable without adjustments to the configuration of the NS constituent. Determining these adjustments at runtime would be a complex task, however it can be simplified using machine learning models, which can be trained and validated using data generated based on the methods used to design the NS.

Figure 12:
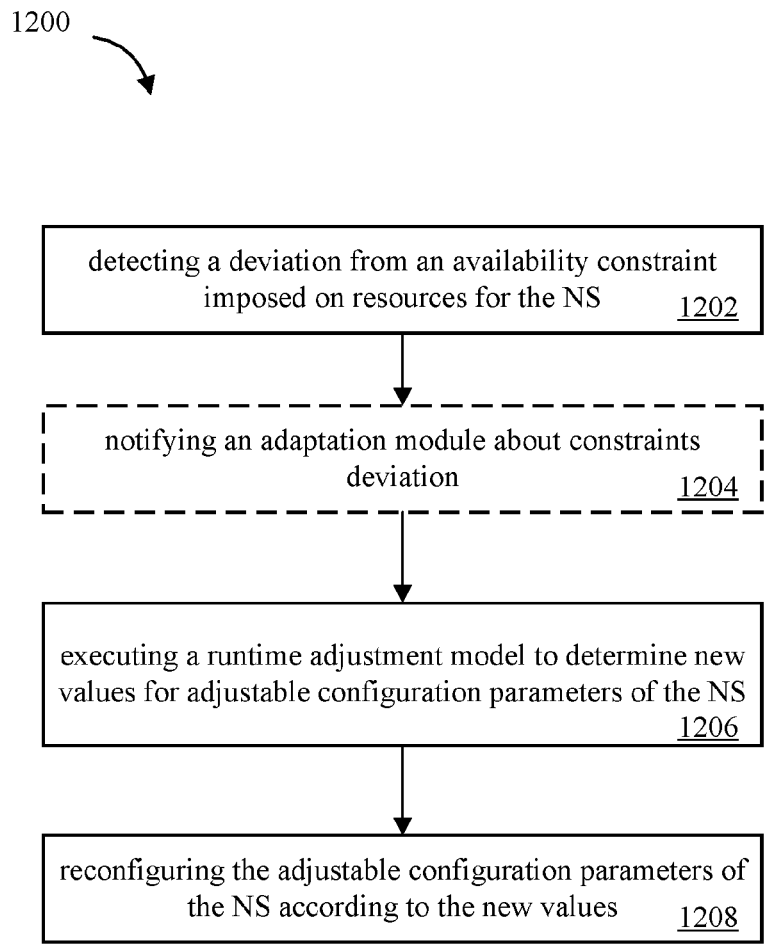
FIG. 12 is a flowchart of a method of runtime adaptation of a network service (NS).

Referring to FIG. 12, there is provided a method 1200 of runtime adaptation of a network service (NS). The method comprises detecting, step 1202, a deviation of an availability constraint imposed on resources for the NS. The method comprises executing, step 1206, a runtime adjustment model to determine new values for adjustable configuration parameters of the NS. The method comprises reconfiguring, step 1208 the adjustable configuration parameters of the NS according to the new values.

The deviation of the availability constraint may comprise any of: failure rate of hosts, availability of hosts, availability of virtual links (VLs), latency of the network, bandwidth of the network, virtual network function (VNF) availability, a VNF failure rate, a number of VNF instances, a number of VL instances and a volume of traffic. The deviation of the availability constraint may be imposed on infrastructure resources for the NS.

The adjustable configuration parameters may comprise any of: health-check rate, checkpointing interval of virtual network functions (VNFs), NS scaling, NS deployment flavor (NsDF) and virtual network functions (VNFs) hosting attribute (via VNF migration).

The adjustable configuration parameters may be determined at the NS level or incrementally at each level of management and orchestration (MANO) functional blocks, wherein only deviations that cannot be compensated for at a given level of the MANO are reported to a next level of the MANO.

The method may further comprise, after detecting a deviation, notifying, step 1204, an adaptation module about constraints deviation.

The runtime adjustment model may comprise a first artificial neural network (ANN) for health-check interval (HI) and checkpointing interval (CpI) values determination for the NS; a second ANN for virtual network functions redundancy determination for the NS; and a mathematical model to calculate a number of virtual links (VLs) instances.

The ANNs may be trained using input data randomly generated for different deviations from different constraint. The output of the first ANN model may be used as input of the second ANN. The activation function for hidden layers of the first and second ANNs may be a Rectified Linear Unit (ReLU) function, the output layer of the first and second ANNs may use a linear function, a loss function of the first and second ANNs may be a mean squared error, and an optimizer may be an adaptive moment estimation (ADAM) algorithm.

The first and second ANNs and the mathematical model to calculate a number of virtual links (VLs) instances may be added to artifacts accompanying a NS design to be deployed on the given architecture. The mathematical model to calculate the number (n) of VLs instances may be provided by:

$$n \geq \log_{(1-A_{vl-current})}(1 - VlEA)$$

where $A_{vl-current}$ denotes a current availability, and VlEA denotes an expected availability of each VL.

Figure 13:
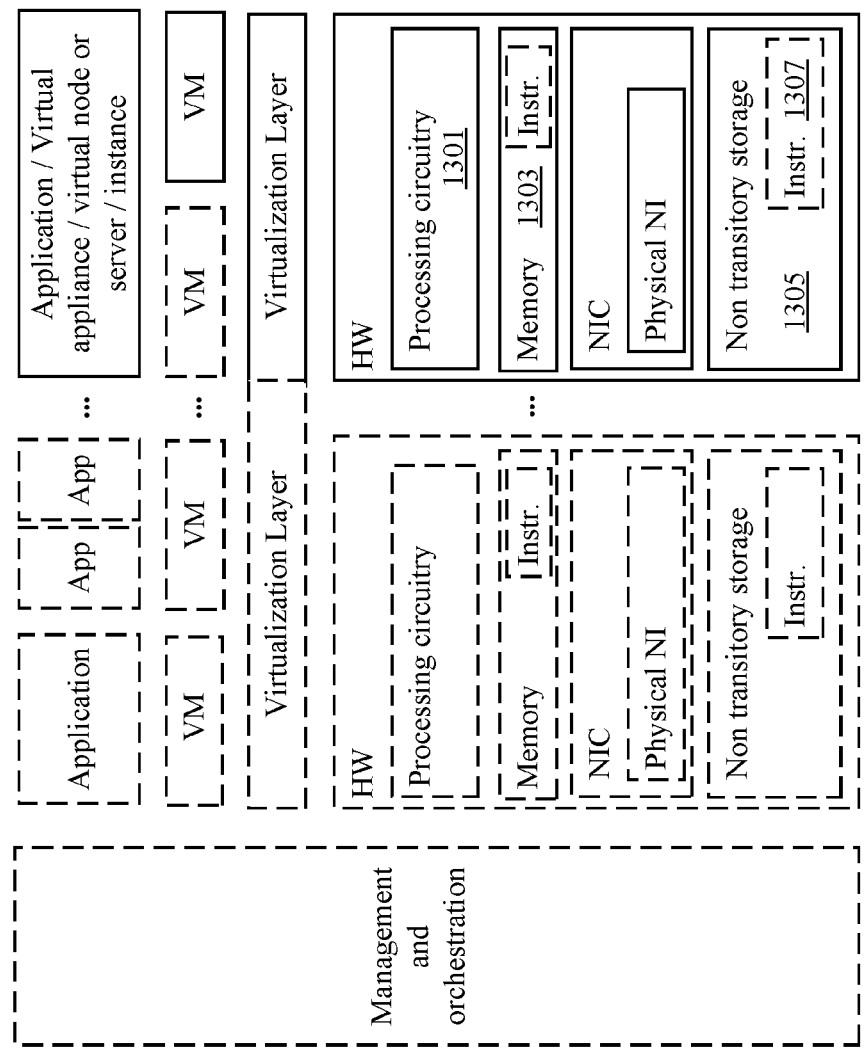
FIG. 13 is a schematic illustration of a virtualization environment in which the different methods and apparatuses described herein can be deployed.

Referring to FIG. 13, there is provided a virtualization environment, similar to the environment depicted in FIG. 11, in which functions and steps described herein can be implemented.

A virtualization environment (which may go beyond what is illustrated in FIG. 13), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 1301 and memory 1303. The memory can contain instructions executable by the processing circuitry whereby functions and steps described herein may be executed to provide any of the relevant features and benefits disclosed herein.

The hardware may also include non-transitory, persistent, machine-readable storage media 1305 having stored therein software and/or instruction 1307 executable by processing circuitry to execute functions and steps described herein.

The instructions 1307 may include a computer program for configuring the processing circuitry 1301. The computer program may be stored in a removable memory, such as a portable compact disc, portable digital video disc, or other removable media. The computer program may also be embodied in a carrier such as an electronic signal, optical signal, radio signal, or computer readable storage medium.

There is provided a network node (HW in FIG. 13) for runtime adaptation of a network service (NS) comprising processing circuitry 1301 and a memory 1303, the memory 1303 containing instructions executable by the processing circuitry 1301 whereby the network node is operative to execute any of the steps described herein.

There is also provided a non-transitory computer readable media 1305 having stored thereon instructions for runtime adaptation of a network service (NS), the instructions comprising any of the steps described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method of runtime adaptation of a network service (NS), comprising:
    detecting a deviation from an availability constraint imposed on resources for the NS;
    executing a runtime adjustment model to determine new values for adjustable configuration parameters of the NS, wherein the runtime adjustment model includes machine learning models comprising a first artificial neural network (ANN) for health-check interval (HI) and checkpointing interval (CpI) values determination for the NS and a mathematical model to calculate a number of virtual links (VLs) instances; and
    reconfiguring the adjustable configuration parameters of the NS according to the new values.

2. The method of claim 1, wherein the deviation from the availability constraint comprises a change in any of: a failure rate of hosts, an availability of hosts, an availability of virtual links (VLs), a latency of the network, a bandwidth of the network, a virtual network function (VNF) availability, a VNF failure rate, a number of VNF instances, a number of VL instances and a volume of traffic.

3. The method of claim 1, wherein the availability constraint is imposed on infrastructure resources for the NS.

4. The method of claim 1, wherein the adjustable configuration parameters comprise any of: health-check rate, checkpointing interval of virtual network functions (VNFs), NS scaling, NS deployment flavor (NsDF) and virtual network functions (VNFs) hosting attribute.

5. The method of claim 1, wherein the adjustable configuration parameters are determined at the NS level or incrementally at each level of management and orchestration (MANO) functional blocks, wherein only deviations that cannot be compensated for at a given level of the MANO are reported to a next level of the MANO.

6. The method of claim 1, further comprising, after detecting the deviation, notifying an adaptation module about constraints deviation.

7. The method of claim 1, wherein the runtime adjustment model further comprises:
    a second ANN for virtual network functions redundancy determination for the NS.

8. The method of claim 7, wherein the ANNs are trained using input data randomly generated for different deviations from different constraint.

9. The method of claim 7, wherein an output of the first ANN model is used as input of the second ANN.

10. The method of claim 7, wherein an activation function for hidden layers of the first and second ANNs is a Rectified Linear Unit (ReLU) function, an output layer of the first and second ANNs uses a linear function, a loss function of the first and second ANNs is a mean squared error, and an optimizer is an adaptive moment estimation (ADAM) algorithm.

11. The method of claim 7, wherein the first and second ANNs and the mathematical model to calculate a number of virtual links (VLs) instances are added to artifacts accompanying a NS design to be deployed on a given architecture.

12. The method of claim 7, wherein the mathematical model to calculate the number (n) of VLs instances is provided by:

$$n \geq \log_{(1-A_{vl-current})}(1 - VlEA)$$

where $A_{vl-current}$ denotes a current availability, and VlEA denotes an expected availability of each VL.

13. A network node for runtime adaptation of a network service (NS) comprising processing circuitry and a memory, the memory containing instructions executable by the processing circuitry whereby the network node is operative to:
   detect a deviation of an availability constraint imposed on resources for the NS;
   execute a runtime adjustment model to determine new values for adjustable configuration parameters of the NS, wherein the runtime adjustment model includes machine learning models comprising a first artificial neural network (ANN) for health-check interval (HI) and checkpointing interval (CpI) values determination for the NS and a mathematical model to calculate a number of virtual links (VLs) instances; and
   reconfigure the adjustable configuration parameters of the NS according to the new values.

14. The network node of claim 13, wherein the deviation from the availability constraint comprises a change in any of: a failure rate of hosts, an availability of hosts, an availability of virtual links (VLs), a latency of the network, a bandwidth of the network, a virtual network function (VNF) availability, a VNF failure rate, a number of VNF instances, a number of VL instances and a volume of traffic.

15. The network node of claim 13, wherein the availability constraint is imposed on infrastructure resources for the NS.

16. The network node of claim 13, wherein the adjustable configuration parameters comprise any of: health-check rate, checkpointing interval of virtual network functions (VNFs), NS scaling, NS deployment flavor (NsDF) and virtual network functions (VNFs) hosting attribute.

17. The network node of claim 13, wherein the adjustable configuration parameters are determined at the NS level or incrementally at each level of management and orchestration (MANO) functional blocks, wherein only deviations that cannot be compensated for at a given level of the MANO are reported to a next level of the MANO.

18. The network node of claim 13, further operative to, after detecting the deviation, notify an adaptation module about constraints deviation.

19. The network node of claim 13, wherein the runtime adjustment model further comprises:
   a second ANN for virtual network functions redundancy determination for the NS.

20. The network node of claim 19, wherein the ANNs are trained using configuration data randomly generated for different deviations from different constraint.

21. The network node of claim 19, wherein an output of the first ANN model is used as input of the second ANN.

22. The network node of claim 19, wherein an activation function for hidden layers of the first and second ANNs is a Rectified Linear Unit (ReLU) function, an output layer of the first and second ANNs uses a linear function, a loss function of the first and second ANNs is a mean squared error, and an optimizer is an adaptive moment estimation (ADAM) algorithm.

23. The network node of claim 19, wherein the first and second ANNs and the mathematical model to calculate a number of virtual links (VLs) instances are added to artifacts accompanying a NS design to be deployed on a given architecture.

24. The network node of claim 19, wherein the mathematical model to calculate the number (n) of VLs instances is provided by:

$$n \geq \log_{(1-A_{vl-current})}(1 - VlEA)$$

where $A_{vl-current}$ denotes a current availability, and VIEA denotes an expected availability of each VL.

25. A non-transitory computer readable media having stored thereon instructions for runtime adaptation of a network service (NS), the instructions comprising:
   detecting a deviation of an availability constraint imposed on resources for the NS;
   executing a runtime adjustment model to determine new values for adjustable configuration parameters of the NS, wherein the runtime adjustment model includes machine learning models comprising a first artificial neural network (ANN) for health-check interval (HI) and checkpointing interval (CpI) values determination for the NS and a mathematical model to calculate a number of virtual links (VLs) instances; and
   reconfiguring the adjustable configuration parameters of the NS according to the new values.

* * * * *